June 1, 1943.   E. MUELLER   2,320,376
DIAMOND CUTTING AND POLISHING MACHINE
Filed Aug. 23, 1941   6 Sheets-Sheet 1

INVENTOR.
Erhard Mueller
BY
ATTORNEY

June 1, 1943. E. MUELLER 2,320,376
DIAMOND CUTTING AND POLISHING MACHINE
Filed Aug. 23, 1941 6 Sheets-Sheet 2

INVENTOR.
Erhard Mueller
BY
ATTORNEY

June 1, 1943.  E. MUELLER  2,320,376
DIAMOND CUTTING AND POLISHING MACHINE
Filed Aug. 23, 1941   6 Sheets-Sheet 3

INVENTOR.
Erhard Mueller
BY
ATTORNEY

June 1, 1943.  E. MUELLER  2,320,376
DIAMOND CUTTING AND POLISHING MACHINE
Filed Aug. 23, 1941  6 Sheets-Sheet 4

INVENTOR.
Erhard Mueller
BY
ATTORNEY

June 1, 1943. E. MUELLER 2,320,376
DIAMOND CUTTING AND POLISHING MACHINE
Filed Aug. 23, 1941  6 Sheets-Sheet 5
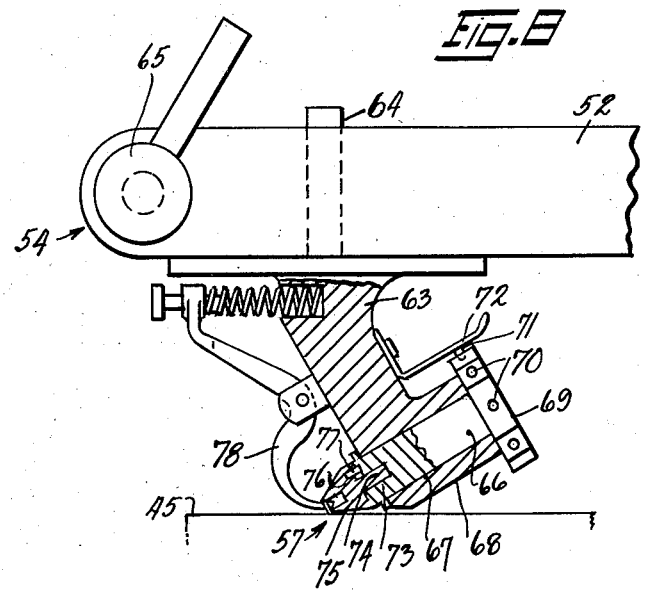
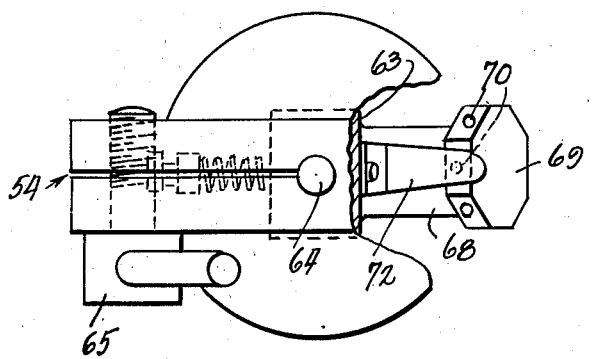
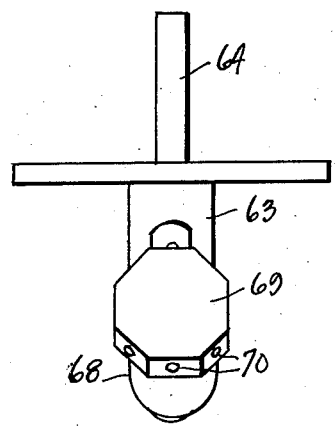
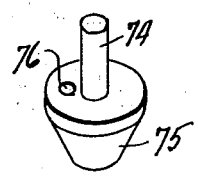
INVENTOR.
Erhard Mueller
BY
ATTORNEY

Patented June 1, 1943

2,320,376

UNITED STATES PATENT OFFICE 2,320,376

DIAMOND CUTTING AND POLISHING MACHINE

Erhard Mueller, New York, N. Y., assignor to Harry Winston, Inc., New York, N. Y., a corporation of New York Application August 23, 1941, Serial No. 408,031

7 Claims. (Cl. 51—120)

This invention relates to diamond cutting and polishing machines and has for one of its objects the provision of means whereby both the cutting and polishing operations will be performed simultaneously.

Another object of the invention is the provision of an eccentrically mounted diamond cutting wheel which when rotated will polish the diamond simultaneously with the cutting thereof.

A further object of the invention is the provision of a machine of the nature referred to, the use of which will to a great extent eliminate the great skill required at present in the cutting and polishing of diamonds.

Still another object is the provision of such a machine whereby a great many diamonds may be cut and polished at one time, one independently of the other, and at the same or at different stages of completion.

Yet another object of the invention is the provision of means which will automatically disengage the diamond from the cutting and polishing wheel when the cutting and polishing operation has been completed.

A still further object of the invention is the provision of a machine of this nature in which the cutting and polishing wheel will present a different surface to the diamond being polished during a great number of revolutions thereof so as to prevent ruts or grooves from forming in the said wheel.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical experssions, one of which, for the purpose of illustration, is shown in the accompanying drawings, in which Figure 1 is a side view partly in section of a diamond cutting and polishing machine made in accordance with my invention;

Figure 1:
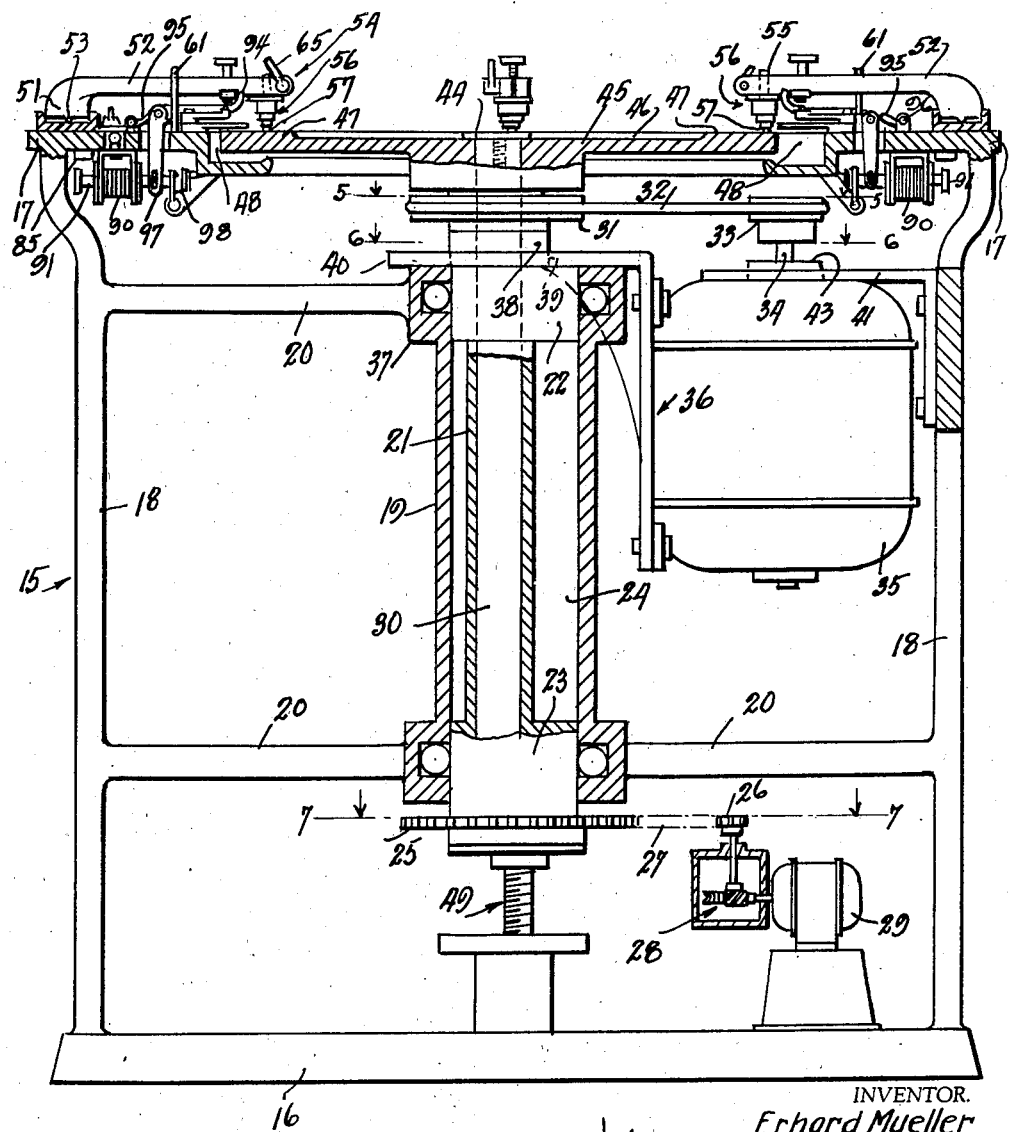
Figure 2:
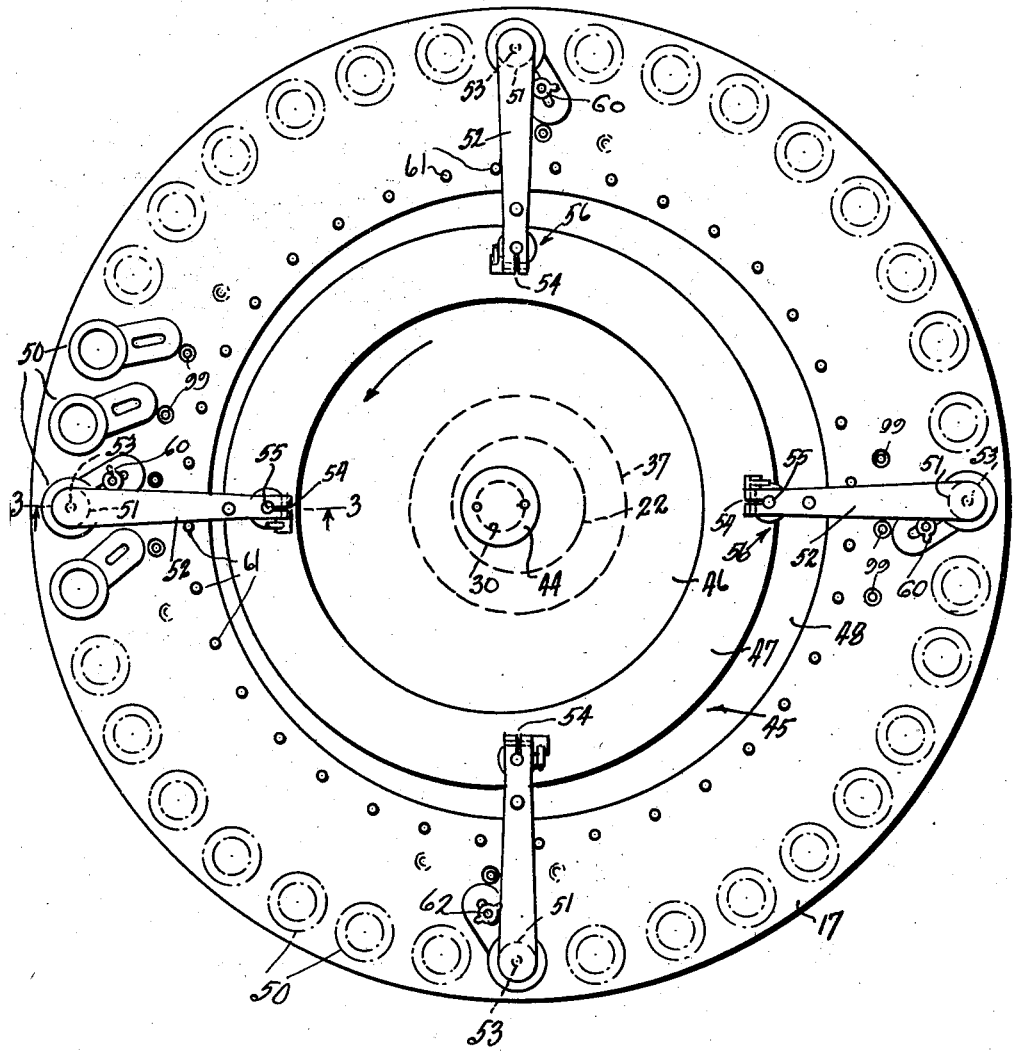
Fig. 2 is a top plan view thereof.
Figure 3:
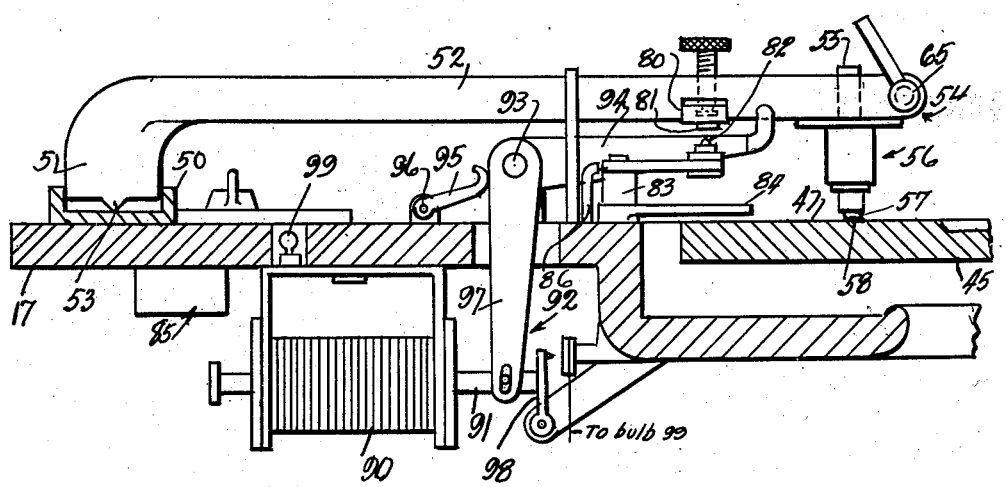
Fig. 3 is a fragmental sectional view taken on line 3—3 Fig. 2.
Figure 4:
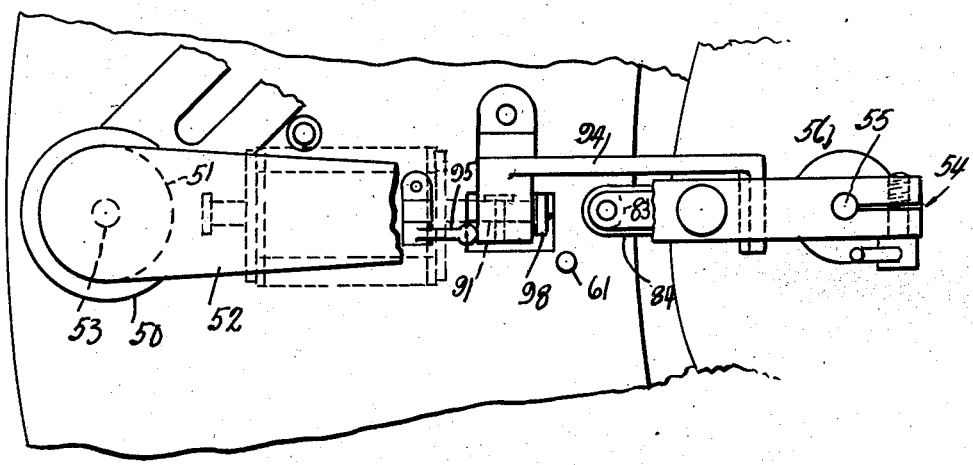
Fig. 4 is a top plan view thereof.
Figure 5:
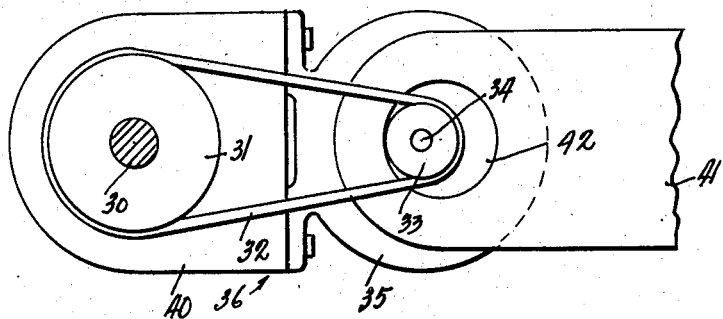
Figure 6:
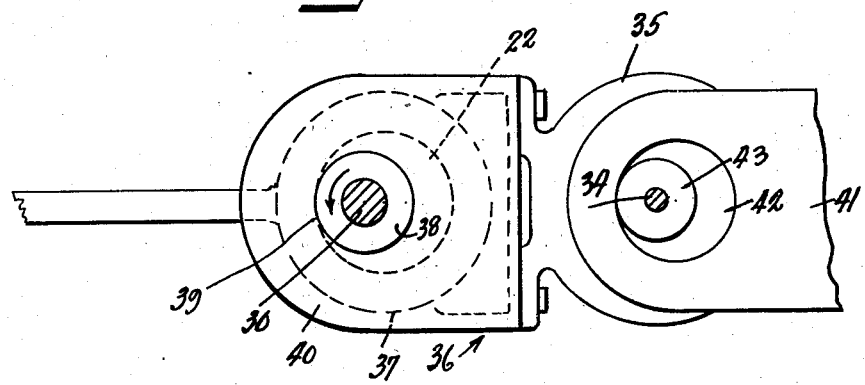
Figure 7:
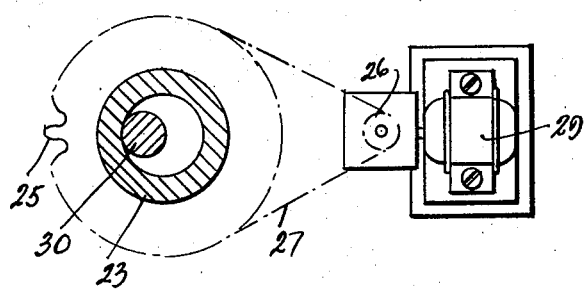
Figure 12:
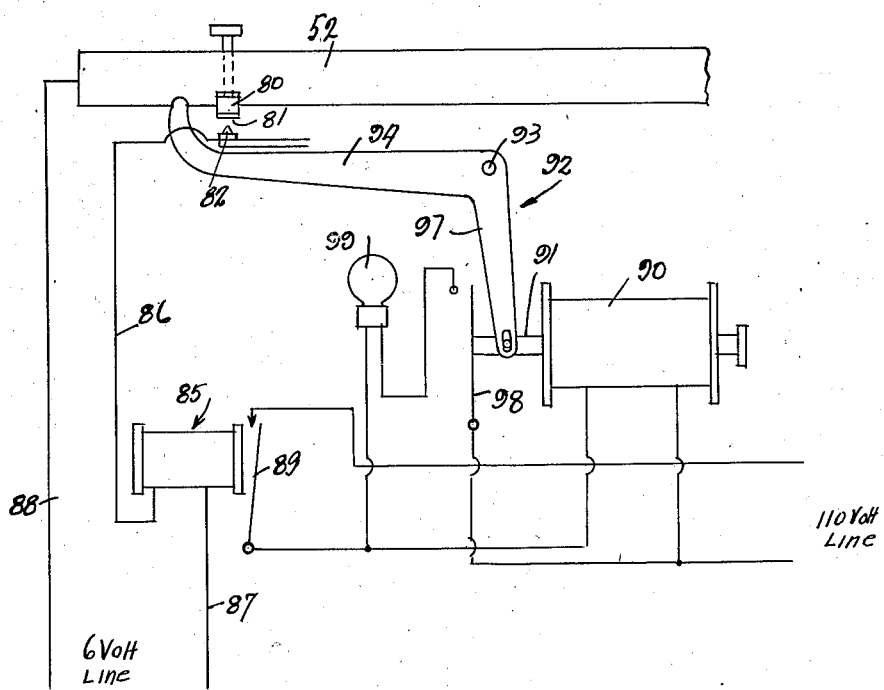
Figure 13:
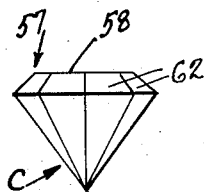

Figs. 5, 6 and 7 are sectional views taken respectively on lines 5—5, 6—6 and 7—7 Fig. 1;

Fig. 8 is a side view partly in section of one form of dop used in my improved diamond cutting and polishing machine;

Fig. 9 is a top plan view thereof partly broken away;

Fig. 10 is a side view looking from the right of Fig. 8 with the dop carrying arm omitted therefrom;

Fig. 11 is a perspective view of the diamond carrying receptacle;

Fig. 12 is a diagrammatic view of the electric and magnetic connections used for each dop carrying arm, and Fig. 13 is a side view of a partly cut diamond.

Referring now to the drawings in detail, 15 indicates the frame of the machine, said frame having a base 16, a top plate or platform 17, webs 18 and a central housing 19 connected to the webs 18 by means of radiating spiders or arms 20. Mounted in the housing 19 is sleeve 21 having an upper hub 22 and a lower hub 23 concentric with the bore 24 in the housing 19. A sprocket wheel 25 is secured to the housing hub 23 and is driven from a sprocket pinion 26 by a sprocket chain 27, the said pinion 26 being driven by means of a worm and worm wheel connection 28 in connection with an electric motor 29 supported on the base 16 of the frame of the machine. The speed at which the sleeve 21 is rotated is preferably eight revolutions per minute.

A shaft 30 is rotatably and eccentrically mounted in the sleeve 21 and has secured near the upper end thereof a wheel or pulley 31 driven by means of a belt 32 from a smaller pulley 33 on a motor shaft 34 of an electric motor 35. The speed of rotation of the shaft 30 is preferably about one thousand revolutions per minute. The motor 35 is secured to a bracket 36 which is supported on the upper bearing or boss 37 of the housing 19. A hub 38 on the sleeve boss 22 passes through an opening 39 in the upper wall 40 of the bracket 36. A bracket 41 secured to the frame 15 is provided with an eccentric hole 42 which is in engagement with the hub 43 on the motor 35. By the arrangement of parts 30 to 43, the motor 35 is given the same oscillating movement as the shaft 30 but is prevented from rotating therewith due to the confining bracket 41.

Mounted on and secured to the upper end of the shaft 30 by means of a screw 44 is a diamond cutting table wheel or disk 45. The said disk having a central depression 46 so as to provide a circular cutting area or ring 47 at the periphery of the said disk, the said disk being made of any suitable material preferably cast iron. The upper frame plate or wall 17 is provided with an eccentric opening 48 to permit of free rotation of the cutting wheel or disk 45. The said disk 45 may be raised or lowered by means of a screw jack 49 in operative engagement with the bottom boss 23 of the sleeve 21 in which the disk carrying shaft is supported.

Adjustably secured to the frame top 17 is a plurality of dished supports 50 in the present instance thirty six such supports are provided. Each support is adapted to receive therein the circular hub end 51 of an arm 52, the said hub having a pivot or fulcrum point 53 which rests on the inner bottom surface of the dished support 50. The said arms 52 are each provided at their front end with a split bearing 54 for the reception of the stem 55 of a dop or diamond holder 56. The dops shown in Figs. 1, 2, 3 and 4 are especially adapted for holding the diamonds 57 when their top surfaces or tables 58 are being cut and polished and are shown in said figures as performing said function.

It will be seen that due to eccentric movement of the disk 45 it will have both a rotary and oscillating movement with respect to the diamond surface being operated upon thus cutting or grinding down and simultaneously polishing said surface. It will further be seen that due to such movement of the disk and the relative rotation of the sleeve 21 and shaft 30 the diamond surface being cut and polished will pass over the same surface of the cutting disk once in every one hundred and twenty five revolutions or as eight is to one thousand. By loosening the thumb screws 60 the position of the arms 52 may be altered at will thus changing the active polishing surface of the disk and further preventing the formation of ruts or grooves on the said cutting and polishing surface of the disk. Pins 61 in engagement with the arms 52 prevent any swinging tendency of the said arms in the direction of rotation of the disk 45.

In Figs. 8 to 11 I have shown a dop arrangement for cutting the angular surfaces or facets 62 of the diamond. Said arrangement comprises a casting or holder 63 provided with a stem 64 identical with the stem 55 and fits into the split bearing 54 where it is clampingly held in position by means of a clamping screw 65 which is also used to clamp the dop 56. A stud 66 fits into an angular bore 67 in a boss or hub 68 of the holder 63 and is provided at the top thereof with an octagonal head 69, each of the eight sides being provided with a recess 70 to receive a detent pin 71 under pressure of a spring 72. The said stud 66 is further provided at the bottom end with an opening or bore 73 adapted to receive the stem portion 74 of a dop or diamond receptacle 75 having an opening 76 for the reception of a locating pin 77 at the bottom of the stud 66. A pivotally mounted spring controlled lever 78 presses against the table of the diamond 57 to keep the said diamond in the receptacle 75 while a facet 62 is being cut and polished. By rotating the stud 66 through an angle of forty five degrees a new or different facet is presented for cutting and polishing. If it should happen that the grain of the diamond does not coincide with the direction of rotation of the disk 45, then the screw 65 is loosened in the arm 52 and the holder 63 is rotated on its pivot 64 until the grain runs in the general direction of rotation of the said disk, the same being true when grinding the table previously described and shown in Figs. 1 to 4.

It is to be understood that provision may be made for cutting and polishing the facets on the culet C, such provision merely involving the furnishing of a dop arrangement for holding the diamond at the required angle to the rotating disk 45.

In order that the diamond be brought out of contact with the cutting surface of the disk 45 when any of the various cutting and polishing operations is completed, I have provided each of the arms 52 with a vertically adjustable slide 80 which carries a contact 81 which when adjusted is positioned a suitable distance from a contact point 82 carried on a block 83 and electrically insulated from the frame of the machine by means of an insulating plate 84. The distance between the contacts 81 and 82 depends upon the amount of grinding required upon any surface of a given size diamond. When such operation is completed the contacts 81 and 82 will come into contact with each other and will close a six volt circuit through a relay 85 one wire 86 of which is connected to the contact 82 the other wire 87 being connected to the source of electric supply, the contact 81 being connected to the other side of the circuit through a wire 88 electrically connected to the arm 52 or any other portion of the machine. The relay 85, when the contacts 81 and 82 are thus brought together will actuate a switch 89 to complete a one hundred and ten volt circuit and energize a solenoid or magnet 90 in the said circuit and actuate its core 91 to swing a lever 92 pivoted at 93 to raise the arm 52 upwardly by means of the upper lever arm 94 of the said lever. The said lever will be maintained in the said raised position by means of a plate 95 pivotally mounted at 96 and in contact with the lower arm 97 of the lever 92. To reset the device the plate 95 is manually brought back to the position shown in Fig. 3. Simultaneously with the action just described the core 91 will close a switch 98 to light an electric bulb 99 in the one hundred and ten volt circuit to apprise the operator of the completion of the operation. (See Figs. 3, 4 and 12.)

From the foregoing it will be seen that not only have I provided means for automatically disengaging the diamond from the cutting and polishing wheel whenever a cutting and polishing operation has been completed, but I have provided signalling means to apprise the operator of such completion.

I desire it understood that in the operation of the machine, it may, if desirable, be polishing thirty six tables, or thirty six facets; or any number of tables and a complementary number of facets or any combination of facets and tables depending upon the capacity of the machine, or if desirable all of the arms 52 or any number of them may be loaded.

From the foregoing it will be seen that I have provided a machine for cutting diamonds and simultaneously with the said cutting operation, polishing the surfaces that are being cut, said simultaneous cutting and polishing being due to particular movement of the cutting table or plate. It will also be seen that when the above operation is completed the diamond will automatically be lifted from the cutting table.

Having described my invention what I claim as new and desire to secure by Letters Patent is:

1. In a diamond cutting machine, an eccentrically mounted cutting disk, a cutting surface on said disk, means for rotating said disk, a diamond carrying arm pivotally mounted at one end for holding a diamond at its opposite end against the cutting face of said disk to be simultaneously cut and polished by the said cutting surface due to the rotating and oscillatory movement of the said disk, and electromagnetic means for automatically disengaging the diamond from the cutting disk upon the completion of said operation, said means comprising an electric contact on the arm, a stationary contact spaced from the first mentioned contact, the said stationary contact being insulated from the machine, a pivotally mounted bell-crank lever one arm of which is in operative engagement with the diamond holding arm, and a solenoid adapted to be electrically energized when the two contacts are brought into contact with each other, the core of said solenoid being in operative engagement with the other arm of the bell crank to swing same and lift the diamond carrying arm to disengage the diamond from the cutting disk when the solenoid is so energized.

2. In a diamond cutting machine, an eccentrically mounted cutting disk, a cutting surface on said disk, means for rotating said disk, a diamond carrying arm pivotally mounted at one end for holding a diamond at its opposite end against the cutting face of the said disk to be simultaneously cut and polished by the said cutting surface due to the rotating and oscillatory movement of the said disk, and electromagnetic means for automatically disengaging the diamond from the cutting disk upon the completion of said operation, said means comprising an electric contact on the arm, a stationary contact spaced from the first mentioned contact, the said stationary contact being insulated from the machine, a pivotally mounted bell crank lever one arm of which is in operative engagement with the diamond holding arm, a relay in a normally open electric circuit with the diamond carrying arm, and a solenoid adapted to be electrically energized when the two contacts are touching and the circuit between the relay and diamond carrying arm is closed, the core of said solenoid being in operative engagement with the other arm of the bell crank to swing same and lift the diamond carrying arm to disengage the diamond from the cutting disk when the solenoid is so energized.

3. In a diamond cutting machine, a stationary central housing, a rotatable sleeve in the said housing, means for rotating same, a shaft eccentrically and rotatably mounted in the sleeve, means for rotating said shaft at a different speed than the sleeve, a disk secured to the shaft, a diamond cutting surface on the said disk, a pivotally mounted diamond carrying arm for holding a diamond against the cutting surface of the disk, to be simultaneously cut and polished, means for lifting the said arm to disengage the diamond from the cutting surface when the cutting and polishing operation is completed, said means including an electric contact on the arm, a second contact normally insulated and spaced therefrom, a solenoid to be energized by the closing of said contacts, and a bell crank lever one end of which is in operative engagement with the solenoid and the other end with the diamond carrying arm as and for the purpose specified.

4. In a diamond cutting machine, a stationary central housing, a rotatable sleeve in the said housing, means for rotating same, a shaft eccentrically and rotatably mounted in the sleeve, means for rotating said shaft at a different speed than the sleeve said means comprising a hub on the sleeve eccentric therewith, a bracket having an opening in which the hub is journalled, an electric motor carried by said bracket, a hub on said motor, a fixed bracket having an opening through which the motor hub passes, said last opening being larger than the diameter of the motor hub and eccentric therewith for the purpose specified, and drive means on the motor in operative engagement with the shaft, a disk secured to the shaft, a diamond cutting surface on the said disk, a pivotally mounted diamond carrying arm for holding a diamond against the cutting surface of the disk, to be simultaneously cut and polished, and electro magnetic means for lifting the said arm to disengage the diamond from the cutting surface when the cutting and polishing operation is completed.

5. In a diamond cutting machine, a stationary central housing, a rotatable sleeve in the said housing, means for rotating same, a shaft eccentrically and rotatably mounted in the sleeve, means for rotating said shaft at a different speed than the sleeve said means comprising a hub on the sleeve eccentric therewith, a bracket having an opening in which the hub is journalled, an electric motor carried by said bracket, a hub on said motor, a fixed bracket having an opening through which the motor hub passes, said last opening being larger than the diameter of the motor hub and eccentric therewith for the purpose specified, and drive means on the motor in operative engagement with the shaft, a disk secured to the shaft, a diamond cutting surface on the said disk, an arm pivotally mounted at one end, a diamond carrying dop structure at the other end of the said arm for holding a diamond against the cutting surface of the disk for abrading a surface thereof, the said dop structure being rotatably adjustable in the arm, and means for lifting the said arm to disengage the diamond from the cutting surface when the said abrading operation is completed.

6. In a diamond cutting machine, a stationary central housing, a rotatable sleeve in the said housing, means for rotating same, a shaft eccentrically and rotatably mounted in the sleeve, means for rotating said shaft at a different speed than the sleeve said means comprising a hub on the sleeve eccentric therewith, a bracket having an opening in which the hub is journalled, an electric motor carried by said bracket, a hub on said motor, a fixed bracket having an opening through which the motor hub passes, said last opening being larger than the diameter of the motor hub and eccentric therewith for the purpose specified, and drive means on the motor in operative engagement with the shaft, a disk secured to the shaft, a diamond cutting surface on the said disk, an arm pivotally mounted at one end thereof, a holder rotatably adjustable at the opposite end of the arm, a stud rotatably and angularly mounted in the holder, detent means for holding said stud in rotated position, a diamond holding receptacle in the said stud for holding a diamond to be cut against the cutting surface of the disk for cutting a surface thereon and means for lifting the said arm to disengage the diamond from the cutting surface when the said abrading operation is completed.

7. In a diamond cutting machine, a stationary housing, a rotatable sleeve in said housing means for rotating same, a shaft rotatably and eccentrically mounted in the said sleeve, an extension on the sleeve, a bracket having an opening through which the extension passes and which it engages, a motor carried by said bracket, a hub on said motor, a fixed bracket having a hole therein, the said hole being eccentric with and of larger diameter than the diameter of the hub but in circumferential contact therewith, a drive shaft on the motor, means for driving the machine shaft from the motor shaft, and a cutting disk on the machine shaft.

ERHARD MUELLER.